US006952453B1

(12) United States Patent
Wollborn

(10) Patent No.: US 6,952,453 B1
(45) Date of Patent: Oct. 4, 2005

(54) METHOD FOR FORMATTING A DATA FLOW BY CODING BASED ON THE SEQUENCE OBJECTS OF ANIMATED IMAGES

(75) Inventor: Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,816

(22) PCT Filed: Jul. 28, 1998

(86) PCT No.: PCT/DE98/02132

§ 371 (c)(1),
(2), (4) Date: May 10, 2000

(87) PCT Pub. No.: WO99/09749

PCT Pub. Date: Feb. 25, 1999

(30) Foreign Application Priority Data

Aug. 15, 1997  (DE)  ................................. 197 35 607

(51) Int. Cl.[7] ............................................. H04N 7/12

(52) U.S. Cl. ................................................ 375/240.26
(58) Field of Search ...................... 375/240.01, 240.26, 375/240.28; H04N 7/12; 348/390.1, 425.1, 348/425.3, 425.4

(56) References Cited

OTHER PUBLICATIONS

MPEG4 Video Verification Model Version 7.0; Apr. 1997, International Organisation For Standardisation, p. 108, Bristol.
Information Technology—Coding of Audio-Visual Objects: Visual, ISO/IEC 14496-2, Committee Draft, May 29, 1998, International Organisation For Standardisation, pp. 51-55, 107-114.

*Primary Examiner*—Young Lee
(74) *Attorney, Agent, or Firm*—Kenyon & Kenyon

(57) ABSTRACT

For object-based coding of moving image sequences for video objects, signaling information indicating whether the video object is to be decoded for playback or displayed is always transmitted regardless of the external form of a video object. In contrast with options available in the past, less data need be transmitted.

4 Claims, 3 Drawing Sheets

METHOD FOR FORMATTING A DATA FLOW BY CODING BASED ON THE SEQUENCE OBJECTS OF ANIMATED IMAGES

FIELD OF THE INVENTION

The present invention relates to a method of processing a data stream for object-based coding of moving image sequences which may have any size and shape.

BACKGROUND INFORMATION

MPEG-4 Video Verification Model Version 7.0, Bristol, April 1997, MPEG-97/N 1642, ISO/IEC JTC/SC 29/WG 11 specifies an encoder and decoder for object-based coding of moving image sequences, where rectangular images of a fixed size are no longer coded and transmitted to the receiver within a video session (VS), but instead video objects (VO) of any size and shape are coded and transmitted. These video objects may then be further subdivided into different video object layers (VOL) to represent different resolution levels of a video object, for example. The image of a VO of a certain layer in the plane of the camera image at a certain time is the video object plane (VOP). Thus, the relationship between VO and VOP is equivalent to the relationship between image sequence and image in transmission of rectangular images of a fixed size.

The syntax for transmission of a VOP specifies first the signaling of the local time base of a VOP. This indicates the time with respect to previously transmitted VOPs at which the instantaneous VOP is to be displayed. FIG. 1 shows the syntax structure for elements VS, VO, VOL and the relevant parts for element VOP.

The parts of the VOP syntax shown here are relevant in this connection. The "modulo time base" element indicates the local time base of the VOP in increments of 1000 milliseconds, and the "VOP time increment" element also indicates the local time base in increments of one millisecond. The "VOP prediction type" element indicates which type of prediction is to be used for the VOP. There are four possibilities here: I-VOP, i.e. no prediction is used, P-VOP, i.e. the prediction is based on the preceding VOP, B-VOP, i.e. the prediction is based on the preceding and following VOPs, and S-VOP where the prediction is based on a SPRITE-VOP which is either transmitted once at the start of the video session or is derived from the reconstructed data during transmission.

In addition to transmission of the local time base of a VOP, the syntax specifies a possibility of signaling the "coded/not coded" state for a VOP. In the case of the "not coded" state for the VOP, no additional data is transmitted after the corresponding signaling elements, and if there is a new VOP, transmission thereof is begun. On the receiver end, a "not coded" VOP is not decoded further and is not displayed.

Here the "video object layer shape" element, which is specified in the area of the header info of the syntax of the respective VOL, indicates whether the VO is a rectangular VO (==0) or is a VO of any size and shape (≠0). Then for the case of a VO of any size and shape, the width of the rectangle surrounding the VOP is indicated with the help of the "VOP width" element. If this width is set to the value 0, this signals that the VOP has the "not coded" state. Then the transmission of the data of the instantaneous VOP is terminated and transmission of the next VOP is begun.

SUMMARY OF THE INVENTION

With the method according to the present invention, it is possible to transmit less data for a non-coded video object, i.e for a video object that is not to be displayed immediately. In contrast with the aforementioned related art, it is simpler and more comprehensible to use a definite element for signaling the state of whether or not a video object is to be displayed.

With the method according to the present invention, it is also possible to transmit and thus to signal the coded/not coded state for rectangular VOs, which had not been possible with the implementation according to the related art.

The signaling information indicating whether a video object is coded or not coded may be inserted before or after the local time base information in the data stream. If the signaling information is inserted before the local time base information, even less data need be transmitted for a non-coded VOP than when the signaling information is inserted after the local time base, because in this case the local time base information is not transmitted. However, in this case, the "blanking out," i.e. suppression of the display of a video object, is no longer possible at a very specific point in time, but instead it can only take place at the next time following the receipt of the non-coded VOP, when an image is displayed at the receiver end.

DETAILED DESCRIPTION

Figure 1:
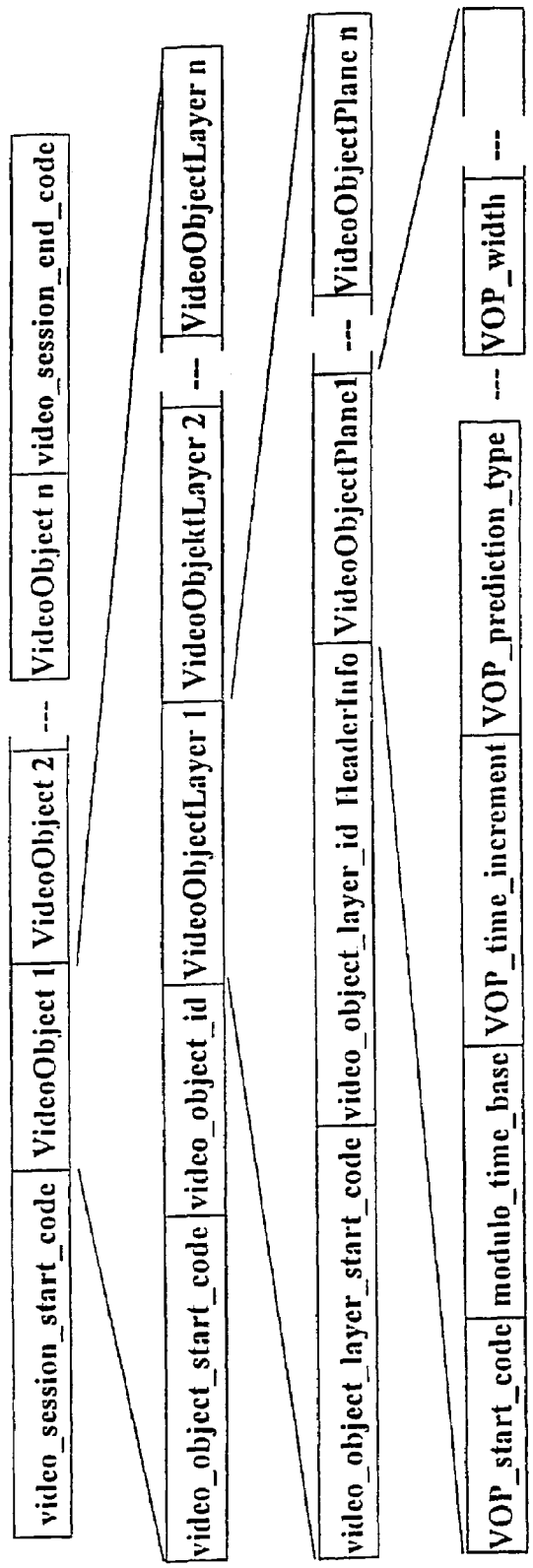
FIG. 1 shows various syntax structures.
Figure 2:
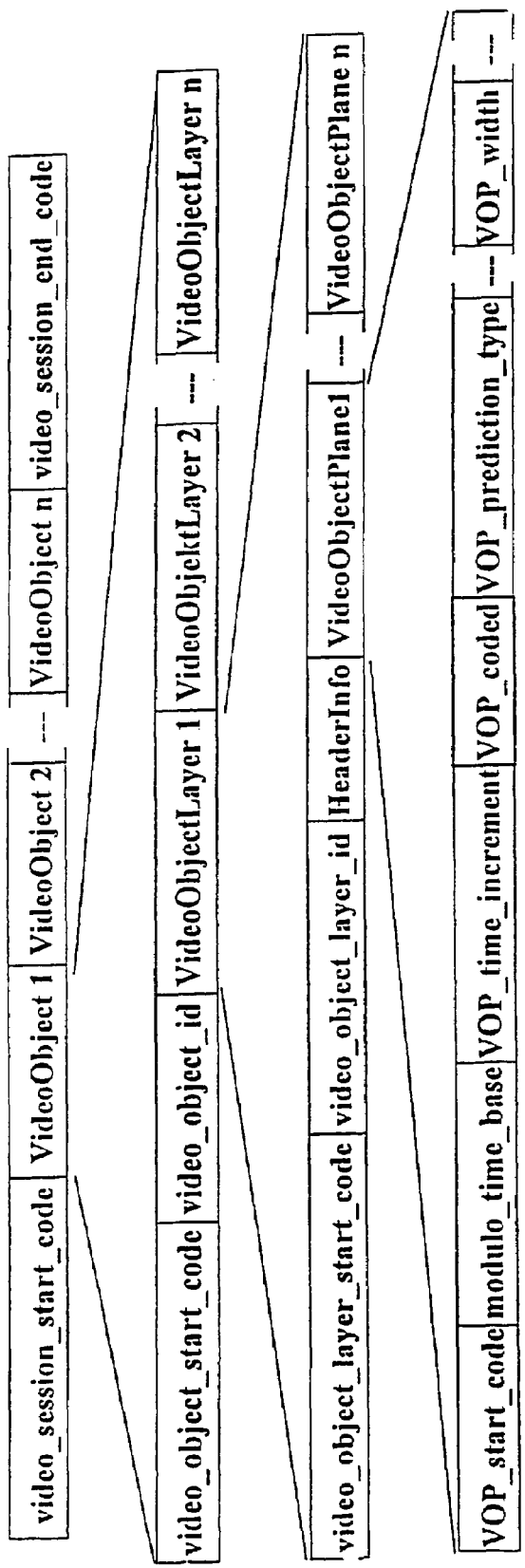
FIG. 2 shows the structure of a data stream, according to an embodiment of the present invention.

FIG. 2 shows the structure of the data stream for the transmission of video objects. At the beginning (first line of the diagram) the "video session start code" element is transmitted and then the information for video objects 1, 2, ..., n is transmitted. At the end, the "video session end code" appears. The second line shows the structure of the transmission format for "video object 1." It begins with the "video object start code" followed by the "video object identification" and the elements for "video object layers" 1 through n. The third line shows the structure of a single "video object layer" element. It begins with the "video object layer start code" followed by the "video object layer identification," the "header info" and elements 1 through n for the "video object plane." The fourth line shows the structure of a single "video object plane" element. It begins with the "VOP start code" followed by the local time base information "modulo time base" and the "modulo time increment" element. This structure thus corresponds to the structure according to FIG. 1. In contrast to FIG. 1, however, a new element in the form of signaling information is always inserted into the data stream according to the present invention, indicating whether the video object is to be decoded for playback or displayed. The signaling information is also inserted regardless of the external form of a video object. This signaling information is composed of the "VOP coded" element and is defined so that the value 0 denotes the "not coded" state and the value 1 denotes the "coded" state. For the receiver, it is necessary to define the fact that the corresponding VO is no longer displayed for the case "VOP coded ==0" at the time indicated by the local time base or at the next following time when an image is displayed at the receiver end. In contrast with the implementation according to FIG. 1, there is no longer any signaling by the "VOP width" element.

Figure 3:
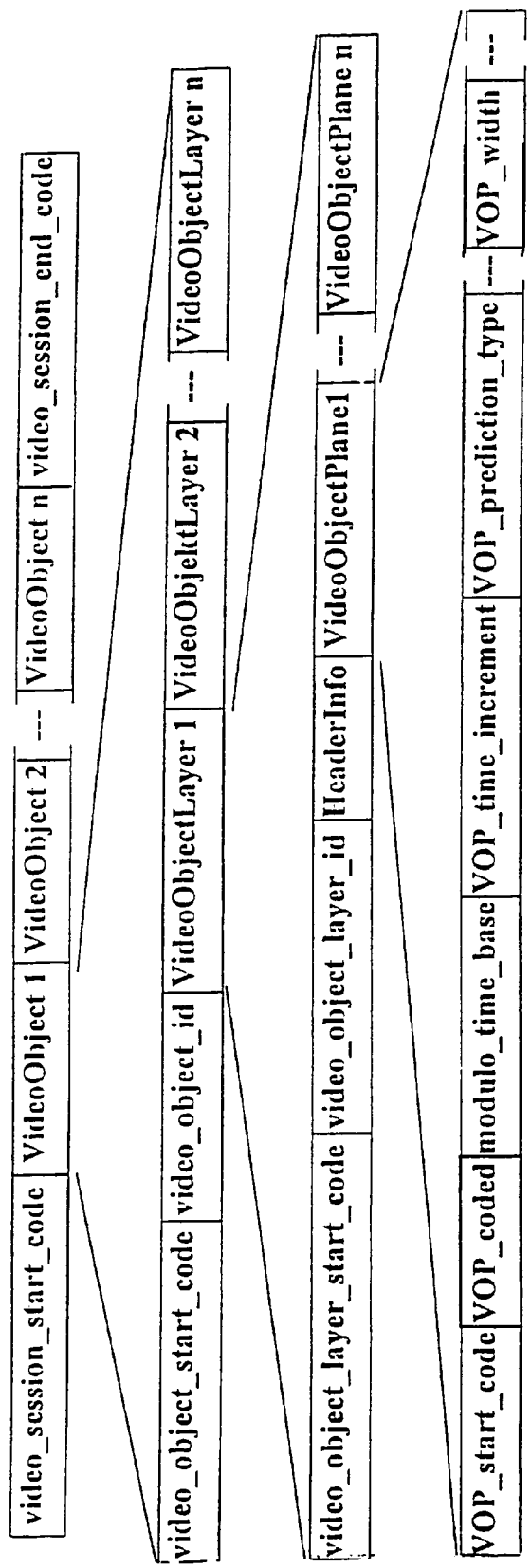
FIG. 3 shows another embodiment of the present invention.

The "VOP coded" element can also be inserted into the data stream after the "VOP prediction type" element. FIG. 3 shows another embodiment of the present invention. "VOP coded" signaling information is then placed directly after the "VOP start code" element, i.e before the local time base information "modulo time base." For this embodiment as well, "VOP width" signaling is no longer performed. In contrast with the first embodiment (FIG. 2), even less data need be transmitted for a non-coded VOP, because the local time base need not be transmitted. However, in this case the "blanking out," i.e. no longer displaying a VO, is no longer possible at a very specific point in time, but instead it can only take place at the next time following the receipt of the "non-coded" VOP, when an image is displayed at the receiver end.

What is claimed is:

1. A method for processing a data stream for object-based coding of moving image sequences for video objects having any size and shape, comprising the steps of:
   inserting a local time base information before an actual information on a video object; and
   inserting signaling information, indicating whether the video object is to be decoded for playback or displayed, into the data stream one of before and after the time base information, regardless of an external form of the video object.

2. The method according to claim 1, wherein the signaling information indicates a coded state and a non-coded state for the video object, and further comprising the steps of:
   terminating a transmission of information on the video object for the non-coded state; and
   suppressing a display for the video object.

3. The method according to claim 1, further comprising the step of, for video objects whose signaling information corresponds to the non-coded state, no longer displaying a corresponding video object at a time determined by the local time base information.

4. The method according to claim 1, further comprising the step of, for video objects whose signaling information corresponds to the non-coded state, no longer displaying a corresponding video object at a next time when there is to be a display after a time determined by the local time base information.

* * * * *